United States Patent [19]
Milleville et al.

[11] 3,883,112
[45] May 13, 1975

[54] PLUG VALVE HAVING COMPOSITE SEAT ELEMENT

[75] Inventors: Bertram J. Milleville, Pittsburgh, Pa.; Herman H. Fowler, Kearney, Nebr.; John H. Fowler, Pittsburgh, Pa.

[73] Assignee: Rockwell International Corporation, Pittsburgh, Pa.

[22] Filed: Feb. 2, 1973

[21] Appl. No.: 328,915

[52] U.S. Cl. .............. 251/174; 251/214; 251/315; 251/317; 137/246.22
[51] Int. Cl. ............................................. F16k 5/06
[58] Field of Search .......... 251/174, 315, 316, 317, 251/214; 137/246.22

[56] References Cited
UNITED STATES PATENTS

| | | | |
|---|---|---|---|
| 3,036,590 | 5/1962 | Knox | 251/174 X |
| 3,064,938 | 11/1962 | Knox | 251/317 X |
| 3,154,094 | 10/1964 | Bredtschneider | 251/174 X |
| 3,275,025 | 9/1966 | Kowalski | 251/174 X |
| 3,306,315 | 2/1967 | Cook | 251/174 X |
| 3,315,697 | 5/1967 | Oliver | 251/174 X |
| 3,346,234 | 10/1967 | Allen | 251/317 X |
| 3,378,026 | 4/1968 | Oliver | 137/246.22 |
| 3,424,190 | 1/1969 | Wolfensperger | 251/174 X |
| 3,497,178 | 2/1970 | Priese | 251/174 |
| 3,584,641 | 6/1971 | Milleville | 251/174 X |
| 3,760,833 | 9/1973 | Kemp | 137/246.22 |

*Primary Examiner*—Harold W. Weakley

[57] ABSTRACT

A trunnion mounted ball valve plug is supported by composite seat rings that each comprise an axially slidable spring biased spherically surfaced metal ring from which projects an initial seal ring that consists of a flat sided annulus of sheet nylon or teflon having its outer periphery anchored in a groove in the metal ring and its inner periphery cut or otherwise formed to a desired size and shape after installation on the metal ring for annular sealing engagement with a rotary ball plug surface.

11 Claims, 9 Drawing Figures

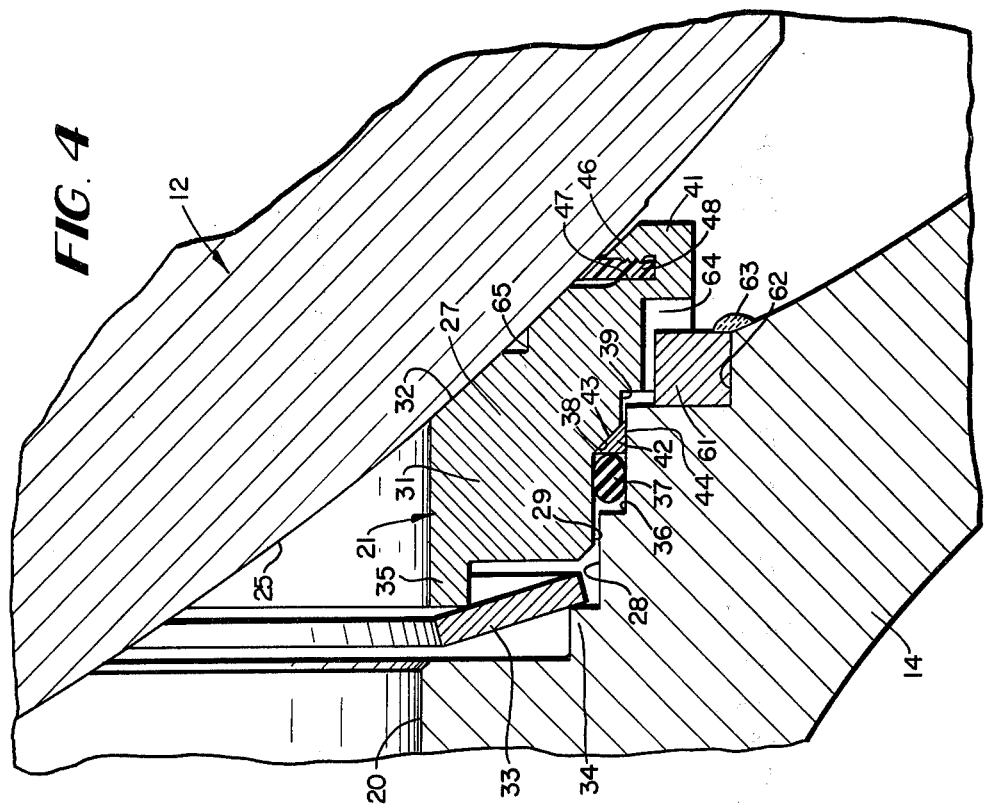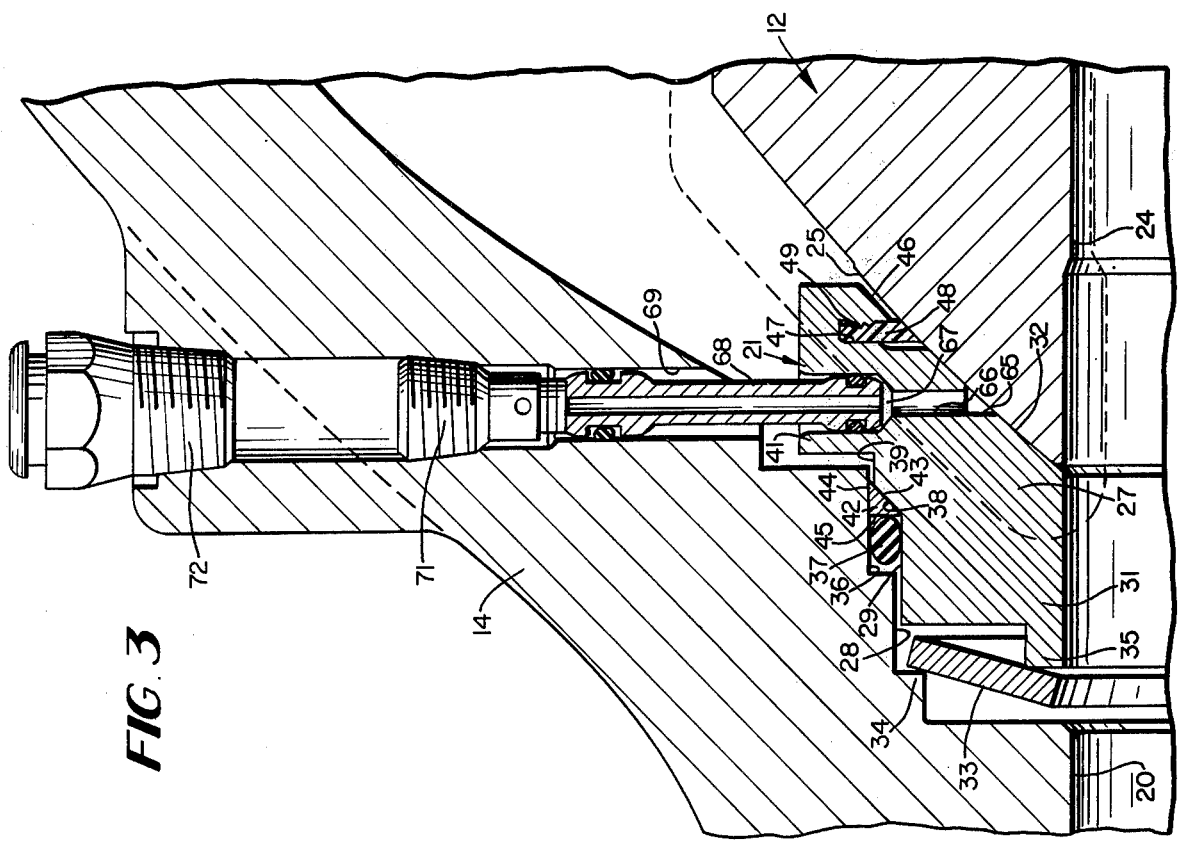

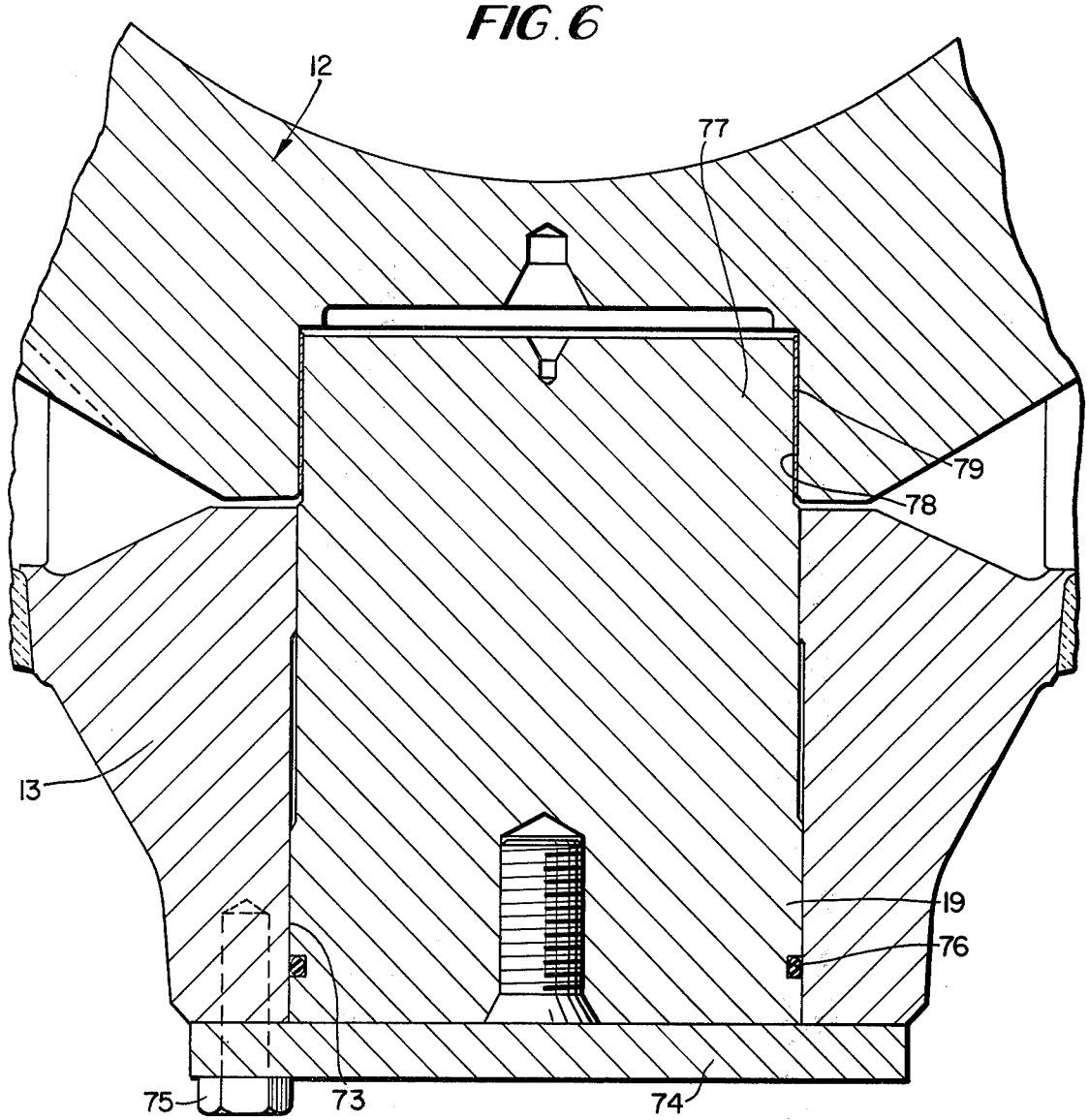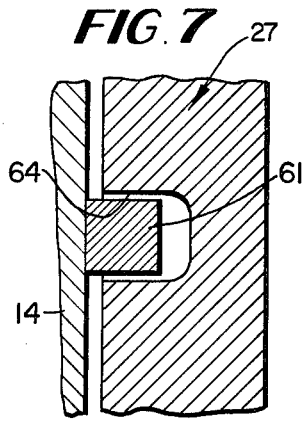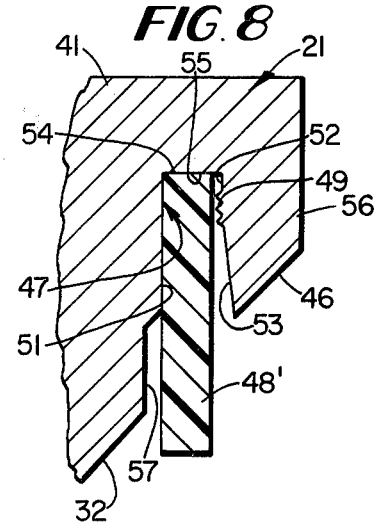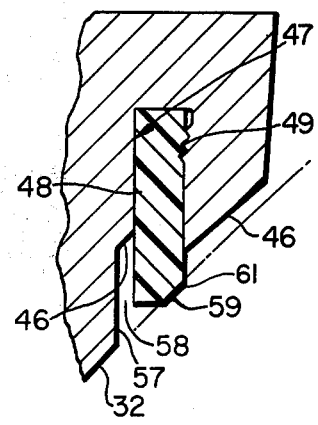

PLUG VALVE HAVING COMPOSITE SEAT ELEMENT

This invention relates to plug valves and particularly to valves of the so-called ball type having special seating and mounting arrangements for the ball plug.

In its preferred embodiment the invention will be described as incorporated in a valve structure wherein a ported plug has rotative trunnion mounting in the valve body and has a surface of spherical contour engaging opposed supporting seat rings that are resiliently axially biased toward the plug. Each seat ring has a composite structure wherein a metal ring supports a special annular plastic insert projecting toward the plug surface.

Valves of this type have been proposed as disclosed for example in U.S. Letters Patents No. 3,424,190 to Wolfensperger, U.S. Pat. No. 3,508,736 to Rhodes et al. and U.S. Pat. No. 3,064,938 to Knox; and the present invention is directed to an improved seat ring mounting and structure, a method of making the seat ring structure and trunnion mount arrangements that have produced a valve that has proved overall to be peculiarly effective in fluid transmission lines and this is a major object of the invention.

Another object of the invention is to provide a novel composite seat ring structure for a ball type plug valve wherein a special annular insert formed from a non-metallic plastic material is mounted in the plug engaging side of a metal ring for providing an initial seal at lower than predetermined line pressures and providing for deflection of the plastic insert without substantial compression or permanent deformation at higher line pressures.

Another object of the invention is to provide a novel composite seat ring having an initial seal insert in the form of a flat sided synthetic plastic ring anchored in and projecting from the metal ring, as well as a novel method of mounting the insert in the metal seat ring which includes the step of shaping and sizing the inner periphery of the annulus after it has been mounted in the metal ring.

A further object of the invention is to provide an improved sealing means between the body and a floating seat in a ball type plug valve.

Another object of the invention is to provide an improved sealing means which provides for a substantial radial clearance between adjacent body and seat ring surfaces in a ball type plug valve and permits the clearnace space to be sealed by means of a resilient seal ring without danger of the seal ring being extruded through the space by line pressure.

Still another object of the invention is to provide a seat ring and body seal assembly which assures that the seat ring will be free to float into engagement with the spherical seating contour of the ball regardless of limited relative movement between the ball and the bore or elastic deformation of the body such as that which may occur under the influence of mechanical loadings from adjacent line pipe.

Another object of the invention is to provide a novel upper trunnion and valve stem association incorporating special bearing and sealing arrangements.

BRIEF DESCRIPTION OF DRAWINGS

FIG. 3 is an enlarged fragmentary view in section showing the composite seat ring strucure at the upper end of the ball at one side;

FIG. 4 is an enlarged fragmentary view in section showing the composite seat ring structure at the lower end of the ball on the same side as FIG. 3;

FIG. 6 is an enlarged fragmentary view in section showing the bottom trunnion arrangement;

FIG. 7 is an enlarged fragmentary view in section showing the body lug and seat recess arrangement for preventing rotation of the seat ring about its axis; and FIGS. 8 and 9 are enlarged fragmentary views in section showing successive steps in mounting the non-metallic plastic insert on the metal seat ring.

PREFERRED EMBODIMENTS

Figure 1:
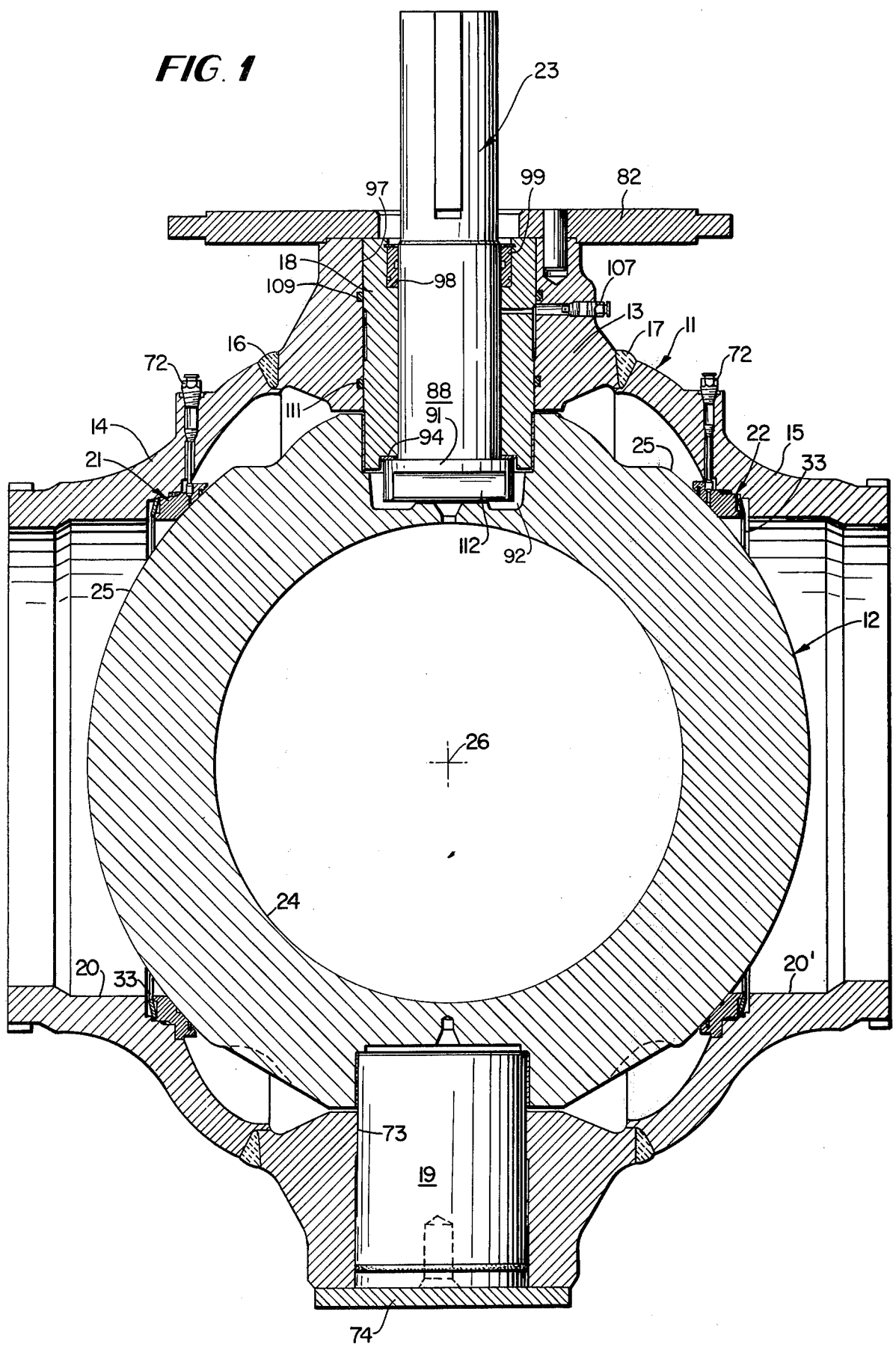
FIG. 1 is a vertical section through a ball valve assembly incorporating the invention according to a preferred embodiment, the valve being shown in closed condition.
Figure 2:
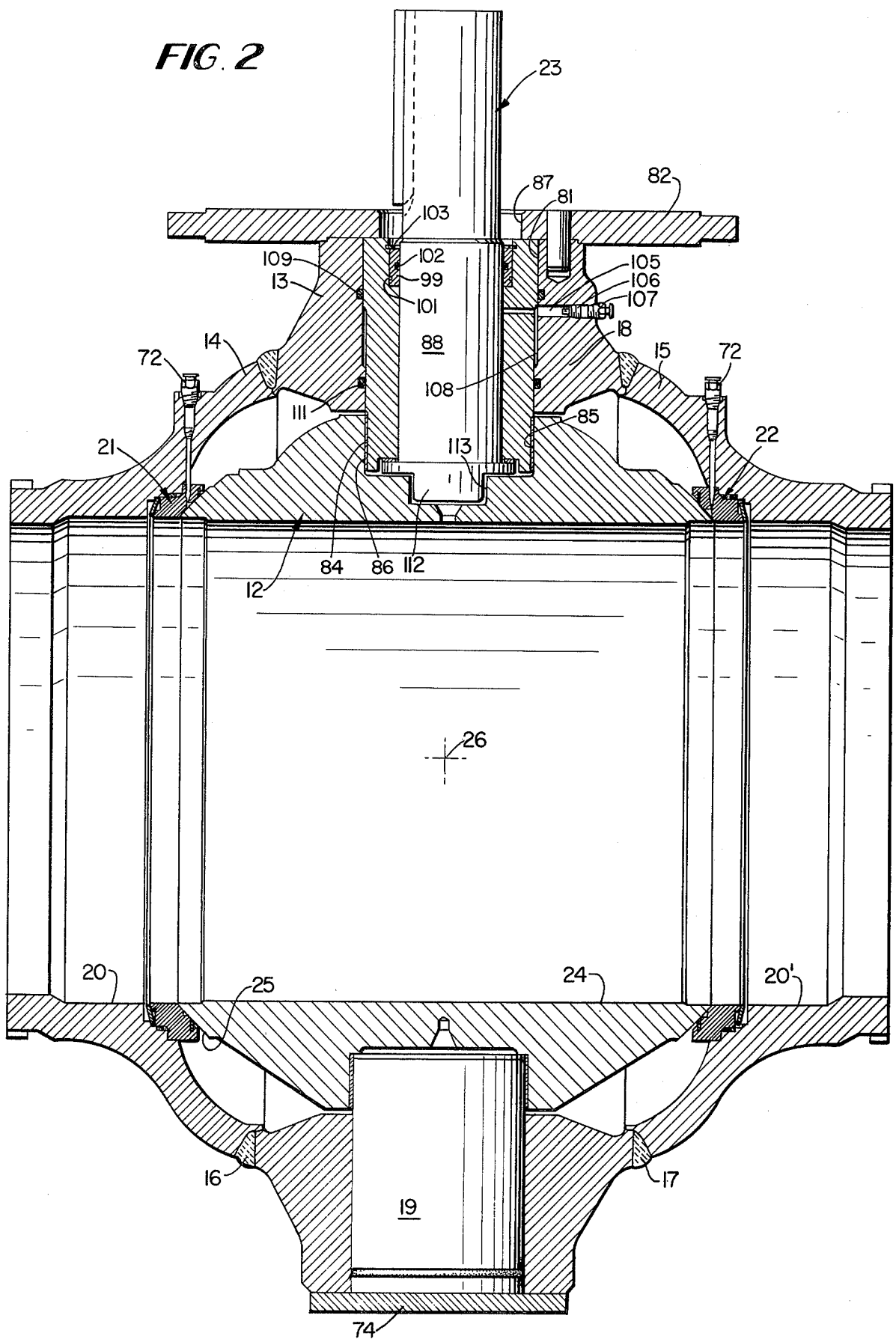
FIG. 2 is a vertical section through the ball valve assembly similar to FIG. 1 but showing the valve in open condition.

Referring to FIGS. 1 and 2 the ball valve assembly of the invention comprises a housing 11 containing a rotatable ball plug 12. Housing 11 has an annular center section 13 and similar annular end sections 14 and 15 that are permanently secured to the center section, after the ball plug is mounted in the center section, by annular weld regions 16 and 17 respectively.

Ball plug 12 is mounted for rotation within the housing about upper and lower cylindrical trunnions 18 and 19 respectively, and upon annular seat ring assemblies 21 and 22. The trunnion mount of the ball supports the pressure load on the ball when the valve is in the closed position and limits displacement of the ball. An actuating stem 23 extends rotatably through the upper trunnion for connection to the ball plug. Ball plug 12 has a cylindrical through port 24 that, when the valve is in the open condition of FIG. 2, is aligned with similar-sized bores 20 and 20' of the housing end sections to provide a cylindrical passageway of substantially uniform-diameter through the valve. The axis of port 24 is at right angles to the axis of rotation of ball 12.

The invention comprises particular novelty in the improved seat ring arrangements and the trunnion mounting of the ball as will appear.

SEAT RING ARRANGEMENTS

The peripheral region 25 of ball 12 that surrounds the opposite ends of port 24 and engages the seat rings 21 and 22 is spherical with its center at 26 which is the point of intersection of the axis of rotation of the ball 12 and the longitudinal axis of port 24. Surface 25 is perferably coated with a durable, low friction plastic material such as tetrafluoroethylene (TFE). Seat rings 21 and 22 are of identical construction and the ensuing description of seat ring 21 will serve equally well to describe the structure, mounting and function of seat ring 22.

Referring to FIGS. 3 and 4, composite seat ring 21 comprises a metal, preferably steel, ring 27 that is axially inserted in a body recess having a cylindrical bore 28 which receives the cylindrical outer surface 29 of section 31 of the ring 27. The cylindrical bore 28 is machined to a larger diameter than surface 29 thereby providing a substantial radial clearance space between the two surfaces. The substantial radial clearance between interfering surfaces of the seat ring 21 and the valve body section 14, and the arrangement for slidably mounting seat ring 21 in cylindrical bore 28 permits the seat ring 21 to float between the valve body and ball plug; that is, this mounting arrangement provides for displacement of the seat ring 21 toward and away from the ball plug 12. At its inner side, metal ring 27 is formed with a concave spherical surface 32 adapted to engage ball surface 25 which has the same curvature. Surface 32 is preferably coated with tetrafluoroethylene. Seat ring 21 is axially urged against the ball by a washer type spring 33 having its outer periphery engaging an annular rib 34 at the outer end of bore 28 and its inner periphery engaging an axial flange 35 on the outer end of metal ring 27. In manufacture, the spherical metal seat ring surfaces 32 of seat rings 21 and 22, are lapped individually to the ball spherical surface 25 to provide as near perfect physical conformity as possible.

The inner end of bore 28 is enlarged to provide a cylindrical wall 36 surrounding ring surface 29 in spaced relation thereto, and a resilient O-ring 37 of rubber or a like elastomer is mounted in that space radially compressed between surfaces 29 and 36. This resilient ring provides the primary seat to body seal in the assembly.

Metal ring 27 is formed axially inwardly of surface 29 with an inclined generally conical surface 38 that intersects a cylindrical surface 39, the diameter of which is greater than that of surface 29 but less than that of cylindrical wall 36. Surface 39 is of such diameter as to provide a radial clearance space of about 0.010 to 0.015 inch between cylindrical wall 36 and cylindrical surface 39. Inwardly of surface 39 the metal ring 27 is formed with its largest external diameter section 41. Surface 38 is disposed at an angle of about 45° to the axis of ring 27.

A metal backup ring 42 that is made of an elastically deformable but hard material such as alloy steel has an inclined surface 43 of approximately the same contour and axial length as metal ring surface 38 and is seated on surface 38. Backup ring 42 has a cylindrical outer surface 44 slidably received in bore 36, and an outer flat axially facing side surface 45 adapted to be engaged by one side of O-ring 37.

Ring 42 has a dual function. In order to assure that the seat ring 27 is truly floating and capable of properly seating against the ball 12 regardless of limited movement of the ball relative to the body bore 20 or elastic deformation of the valve body under the influence of mechanical loadings from adjacent line pipe, it is necessary that some substantial radial clearance space be provided between the seat ring 27 and the valve body 14. With reference to FIGS. 3 and 4 it will be noted that a substantial radial clearance space is provided between the surfaces formed by valve body bore 28 and cylindrical wall 36 and seat ring surfaces 29 and 39 respectively. It will also be noted that the primary seat to body seal which is provided by resilient O-ring 37 must be effective to seal the relatively large radial clearance provided between the valve body cylindrical wall 36 and seat ring surface 39. The radical clearance necessary to give the seat ring 27 the required floating action is sufficiently large that it would not be prudent for one to rely on the O-ring 37 to seal the clearance space without danger of the O-ring being forced or extruded through the clearance space when the O-ring is subjected to the pressure of fluid flowing through the body bore 20.

The use of backup ring 42 avoids the O-ring extrusion problem since the ring 42 permits the use of a substantial clearance space between valve body cylindrical wall 36 and seat ring surface 39 without concern for the problems attendant to sealing such a large clearance space with a resilient O-ring. Backup ring 42 serves to close a major portion of the substantial radial clearance between the valve body bore 37 and seat ring surface 39 with no adverse affect on the ability of seat ring 27 to float relative to the valve body 14. The cylindrical outer surface 44 of backup ring 42 provides a very small radial clearance between the ring 42 and the valve body cylindrical wall 36. When the primary seal components, that is O-ring 37 and metal backup ring 42, are in the relaxed position there will be a small radial clearance between the inclined surface 43 of backup ring 42 and the inclined surface 38 of seat ring 27 which may vary at different points. The variation in this clearance will not in and of itself be detrimental because it should assist in providing for relative movement between the seat ring 27 and metal backup ring 42. When the ball 12 is moved to the closed position as shown in FIG. 1, the primary seal assembly is subjected to upstream line pressure which, in acting on resilient O-ring 37, will force the O-ring against metal backup ring 42 thereby urging ring 42 toward the opposing inclined surface 38 on seat ring 27. Since the metal backup ring 42 is formed of an elastically deformable material and is very small in cross section it can move or deform locally whatever distance may be required to contact the inclined surface 38 of seat ring 27 even though the required movement may vary around the periphery of the ring 42. Thus, as the primary seal components are exposed to full line pressure, the radially inner and outer edges of surface 45 of ring 42 will be in close proximity to seat ring surface 38 and valve body surface 36 respectively thereby providing very small clearances between those respective surfaces which can be sealed by the O-ring 37 with no danger of the resilient O-ring 37 being forced or extruded through the substantial clearance provided between seat ring surface 39 and valve body surface 36.

The ring 42 also provides for fire or like protection in the event that elastomer ring 37 may be destroyed by fire. In that event, upstream or explosion pressure will act on the backup ring 42 to wedge the ring tightly and sealingly between the seat ring 27 and the valve body.

Outwardly of spherical surface 32 the inner side of metal ring 27 is cut away to provide an annular surface 46 spaced a small distance from the ball in the assembly, and a relatively deep annular continuous groove 47 is formed in the ring with its inner end opening into that space. An annular initial seal element 48 which is here a relatively flat sided solid annulus of nylon, tetrafluoroethylene or a like hard smooth inert synthetic plastic sheet material is tightly anchored in groove 47, preferably by means of serrations or projections 49 that penetrate the side of annulus 48. Seal element 48 extends in a plane substantially at right angles to the flow axis.

FIGS. 8 and 9 illustrate a preferred manner of mounting the synthetic plastic annulus 48 on the metal seat ring. As shown in FIG. 8 the metal ring is formed to provide the recessed surface 46 and the groove 47. Groove 47 is initially formed with one flat side 51 that is substantially at right angles to the ring axis, and the other side 52 is flat at the root end and formed with projections 49 but then is inclined at 53 at a small angle to accept the outer periphery of annulus 48.

The circular outer periphery 54 of an annular flat sided plastic blank 48' of uniform thickness and width is of the same diameter as the flat bottom 55 of groove 47, so that upon insertion the outer periphery of the blank will seat on the bottom of the groove and one side of the blank will be flush with groove side 51. Insertion of the blank is facilitated by its laterally flexible nature. After insertion of the blank, the inner rim section 56 of metal ring 27 is deformed inwardly to the position shown in FIG. 9 whereby the groove side 52, 53 is parallel to side 51 and the projections 49 are forced to penetrate the blank which is now anchored securely and tightly on ring 27.

It will be noted that groove 47 enters the space between the ring and ball provided by recessed surface 46 a short distance from the annular surface 57 connecting an end of surface 46 with spherical ring surface 32 that engages the ball. This provides a deflection space 58 (FIG. 9) in the side of the groove wherein the inner periphery of the initial seal ring is unsupported laterally.

After the blank 48' is secured in place, its inner end is trimmed to the length and shape shown in FIG. 9 wherein the inner periphery is provided with an inclined surface 59 disposed in intersecting relation to a spherical envelope corresponding to surface 32. Surface 59 is preferably disposed at an angle to intersect a tangent to ball surface 25 at an acute angle. Surface 59 is so located that its smaller diameter corner 61 projects within the spherical surface envelope, which is shown as a dot dash line in FIG. 9, so that in the assembly even with very low or no upstream pressure in the line, the composite seat ring 21 is pressed with sufficient force against the spherical surface of ball 12 by spring 33 that the relatively free inner end of initial seal ring 48 has annular continuous resilient sealing engagement with ball surface 25. Upon increased upstream pressure in the line urging the composite ring 21 toward the ball, the inner periphery of plastic seal element 48 is deflected into space 58 while retaining sealing contact with the ball surface and spherical metal surface 32 seats on the ball surface to effect sealing contact therebetween. The annular synthetic plastic initial seal element 48 is of rectangular cross section and its sectional length or radial dimension is preferably at least three times its thickness or axial width to provide sufficient flexibility for the inner periphery of element 48 to flex under line pressure and deflect into space 58.

The foregoing method of making the synthetic plastic ring insert and assembling it with the metal ring provide an important phase of the invention. The metal ring may be machined to provide surface 46 and groove 47. The annular blank for the plastic insert ring may be quicklu stamped or cut out of flat sheet usually nylon or tetrafluoroethylene. After installation of the blank on the metal ring, the internal periphery of the blank is cut ot provide the desired length of internal projection of the insert and the relative angularity of its free inner peripheral surface with respect to the spherical surfaces 25 and 32. There is no need to shape or dimension the inner periphery of the plastic ring prior to its installation on the metal ring, nor is there any need for exact tolerances to be maintained in fitting the insert ring to groove 47. A further advantage is that minor damage to the initial seal ring 48, such as might be inflicted by sharp foreign matter or fluid cutting, does not prevent or adversely affect the metal-to-metal seal between spherical surfaces 25 and 32 which are respectively provided on the ball plug 12 and the seat ring 27.

Seat ring 21 is anchored against rotation about its axis by the structure shown in FIGS. 4 and 7 wherein a rigid lug 61 fixed in a recess 62 of the housing 14 as by welding indicated at 63 projects slidably into a socket 64 formed in metal ring 27. This arrangement prohibits any appreciable shift of the seat ring assembly. However, since lug 61 does not completely fill the socket 64 it does not interfere with the aforementioned floating movement of the seat ring 27 relative to the ball plug 12 and valve body bore 20.

Seat ring assembly 21 is of the lubricating and sealing type and it is formed in spherical surface 32 with annular grooving 65. At the upper part of the valve, grooving 65 is connected by a passage 66 to a chamber 67 in ring 27. This chamber sealingly slidably and rockably contains the lower generally spherically contoured end of a lubricant and sealant introduction conduit 68 that has its other generally spherically contoured end sealingly slidably and rockably received in a housing passage 69. Conduit 68 communicates through a check valve 71 with a lubricant introduction fitting 72 whereby fluent plastic lubricant and sealant under pressure may be introduced from exteriorly of the housing into the grooving 65 where it may exert pressure to separate the spherical seat ring and ball surfaces and spread therebetween a lubricating and pressure sealing film. This arrangement for introducing the lubricant and sealant into the seat ring grooving is preferably similar to that disclosed in said Wolfensperger patent to which reference is made for further detail. The universally mounted ends of conduit 68 permit relative movement of the seat ring assembly and housing while retaining the conduit periphery sealed against fluid leakage from the valve.

Seat ring 22 is preferably of the same construction and mounting as seat ring 21.

TRUNNION ARRANGEMENTS

With reference to FIG. 6, the lower trunnion 19 is a cylindrical column fixed as by force fit in a cylindrical bore 73 in the lower part of the housing center section, and the lower end of bore 73 is closed by a flat plate 74 secured to the housing as by bolts 75. Plate 74 abuts the flat bottom end of trunnion 19 and helps support it in the assembly. A resilient O-ring seal 76 compressed in an annular groove of the trunnion near the lower end of bore 73 provides a static pressure seal.

The upper end of trunnion 19 is a cylindrical section 77 that projects out of the valve housing into a cylindrical bore 78 lined with a bushing 79 in the bottom of the ball plug 12. Bushing 79 may be a suitable metal impregnated with TFE. Thus the lower end of ball 12 is rotatably mounted on trunnion 12 but the weight of ball 12 is not carried by trunnion 12. The entire weight of the ball is carried by the seat rings 21 and 22.

Figure 5:
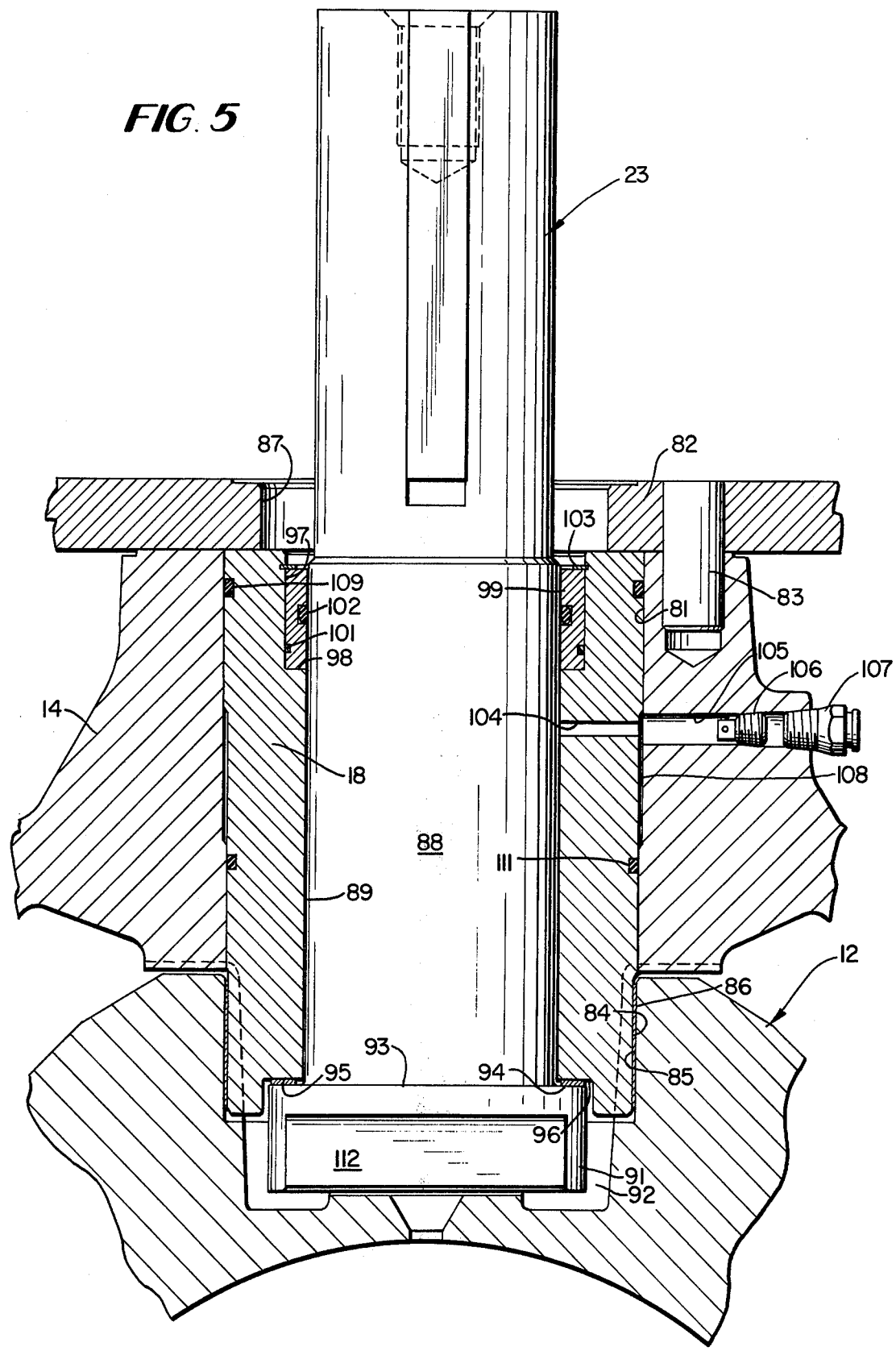
FIG. 5 is an enlarged fragmentary view in section showing the upper trunnion and the valve actuating stem and its connection to the upper end of the ball plug.

The upper trunnion 18, as shown in FIG. 5, is a hollow column fixed within a cylindrical bore 81 in the upper part of the housing center section. Trunnion bores 73 and 81 are coaxial and preferably of about the same diameter. A plate 82 is secured to the housing across the top open end of bore 81, as by a dowel 83 extending into a recess in the housing and bolts (not shown). This plate engages the flat upper end of trunnion 18 and helps retain the trunnion in its bore.

The lower end of upper trunnion 18 is externally cylindrical at 84 and projects from the housing into a cylindrical bore 85 lined with a bushing 86 in the upper part of the ball plug 12. Bushing 86 may be impregnated with TFE. Trunnion 18 does not extend to the bottom of bore 85, so that, like bore 78 with which it is coaxial and of the same diameter, it provides only rotative connection with the ball and does not support the weight of the ball.

Valve stem 23 extends through an enlarged opening 87 in plate 82, and it has a cylindrical section 88 rotatably disposed in cylindrical bore 89 of hollow trunnion 18, there being sufficient clearance between surfaces 88 and 89 to provide free operation of the stem regardless of bending forces acting on the trunnion 18. Below bore 89 the valve stem is formed with an enlarged coupling section 91 extending within a recess 92 in the upper end of the ball plug 12. An axially upwardly facing flat annular shoulder 93 on the valve stem has thrust bearing engagement with the end of trunnion 18 through a flat TFE impregnated metal washer 94 surrounding the valve stem and seated in the flat bottom 95 of an internal shoulder 96 in the lower end of the trunnion.

At the upper end of the trunnion 18, bore 89 is formed with an enlarged diameter portion 97 providing a flat annular shoulder 98. A cylindrical seal element 99 seated on shoulder 98 is formed with annular grooves mounting compressed resilient O-rings 101 and 102 that seal against escape of gas pressure from the interior of the housing along the valve stem. Seal element 99 is axially retained in the end of the trunnion by a snap ring 103 in a groove in surface 97 and extending over the top of element 99. Seal element 99 may be removed and repaired or replaced while the valve remains in service.

A radial passage 104 in trunnion 18 provides communication with an aligned housing passage 105 that has at its outer end a check valve 106 and a lubricant admission fitting 107. Lubricant admitted through fitting 107 is thus supplied to provide a lubricating film between the cylindrical surfaces of the valve stem and trunnion bore 89.

Passage 105 also communicates with a thin annular space 108 between the outer surface of trunnion 18 and the housing bore 81, whereby some of the lubricant fills that space to provide a pressure seal preventing escape of gas pressure along the outside of the trunnion. Compressed resilient O-ring seals 109 and 111 above and below space 108 prevent passage of lubricant axially beyond them.

As shown in FIGS. 1 and 2, the coupling section 91 of the valve stem has a depending flat sided tongue 112 that fits within a groove 113 formed in the upper part of the ball. This groove 113 defines a space 92 that is longer than tongue 112, thereby providing a non-binding torque transmitting connection between the valve stem and the ball plug 12. In operation, fluid pressure within the valve housing will act on the lower end of stem 23 and tending to force it upward until such movement is prevented by the enlarged lower end of the stem engaging the lower end of the trunnion 18. The thrust washer 94 reduces the torque needed to turn the stem 23.

The foregoing provides a high capacity valve that embodies low torque operation, reliable sealing at the seats and valve stem and fire protection, features that are paramount in gas or petroleum product line valve requirements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a plug valve of the type wherein a ported plug is rotatably mounted in a valve body for movement between a valve closed position wherein it blocks a fluid passage through the valve and a valve open position wherein the plug port becomes a continuation of the body passage, seat rings mounted in said body surrounding passage openings at opposite sides of the plug and having spherical surface means adapted for engaging corresponding spherical surface means on said plug during rotation of the plug between said positions, at least one of said seat rings being a composite seat ring comprising a metal annulus having an axis parallel with the fluid passage and formed with said spherical surface means and an annular groove extending in a direction normal to the axis of said consisting essentially of a flat sided relatively narrow annulus of synthetic plastic material, said annulus having a substantially greater width than thickness and laying in width in a plane normal to the axis of the annulus, said annulus having its outer periphery fixed in said annular groove and its innere periphery projecting from said metal seat ring into deformable pressure engagement with said surface means of the plug.

2. In the plug valve defined in claim 1, both of said seat rings being of substantially the same composite seat ring structure.

3. In the plug valve defined in claim 1, means providing an annular internal recess at the inner end of the side of said groove between said initial seal ring and said spherical surface means on said one seat ring to provide space wherein the inner periphery of the initial seal ring may deflect when pressed with sufficient force against the plug surface.

4. In the plug valve defined in claim 1, means within said valve body providing upper and lower trunnions mounting said plug for rotation about an axis normal to the axis of its port, said upper trunnion comprising a hollow tubular member fixed on the body and having a cylindrical inner end section projecting into a cylindrical recess in said plug, and a valve actuating stem rotatably mounted in said hollow trunnion extending through said hollow trunnion into an axially detachable torque transmitting association with said plug whereby said plug recess provides a rotative bearing fit with the inner end section of said upper trunnion during rotation of said plug by said stem.

5. In the plug valve defined in claim 1, means in the slidable mounting of said one seat ring providing an annular resilient seal member radially compressed between oppositely disposed axially extending cylindrical surfaces provided respectively to said body and metal annulus, and a metal extrusion prevention ring having an inclined face surrounding said cylindrical surface provided to said metal annulus within said slidable mounting and disposed axially between said seal member and a corresponding inclined annular surface on said metal annulus with said inclined face of said metal extrusion prevention ring bearing against said inclined annular surface on said metal annulus.

6. In a plug valve of the type wherein a ported plug is rotatably mounted in a valve body for movement between a valve closed position wherein it blocks a fluid passage through the valve and a valve open position wherein the plug port becomes a continuation of the body passage, seat rings mounted in said body surrounding passage openings at opposite sides of the plug and having spherical surface means adapted for engaging corresponding spherical surface means on said plug during rotation of the plug between said positions, at least one of said seat rings comprising a metal annulus formed with said spherical surface means and mounted in a body recess for displacement toward and from the plug, resilient means biasing said one seat ring toward said plug, oppositely disposed axially extending cylindrical surfaces provided respectively to said body recess and said one seat ring and defining an annular space therebetween, the inner end of one of said cylindrical surfaces intersecting with a surface inclined toward the other said cylindrical surface, an annular resilient seal member compressed between said oppositely disposed cylindrical surfaces and an elastically deformable metal wedge ring surrounding said cylindrical surface provided to said one seat ring, said wedge ring being disposed axially between said resilient seal member and said inclined surface and having on one side an axial face adapted to be engaged by said resilient seal member and on the other side an inclined face adapted to engage said inclined surface whereby said one seat ring is mounted for movement relative to said body recess and said plug and said elastically deformable metal wedge ring sealingly closes any variations in spacing which may occur between said one seat ring and said body recess.

7. In the plug valve defined in claim 6, said wedge ring being an internal steel ring of uniform cross section.

8. In the plug valve defined in claim 6, both of said seat rings being of substantially the same structure and slidably mounted on the body in the same way.

9. The plug valve defined in claim 6 wherein said body recess is provided by at least two stepped cylindrical bores, the larger diameter cylindrical bore provides said cylindrical surface to said body recess, said inclined surface is provided between two axially extending cylindrical surfaces provided to said one seat ring and said axially extending cylindrical seat ring surfaces are radially spaced from said stepped cylindrical bore surfaces.

10. In a plug valve comprising a body having opposed passage sections opening internally into a plug mounting space, a ported plug rotatably mounted in said space for movement between a valve closed position wherein it blocks a fluid passage, through the valve and a valve open position wherein the plug port becomes a continuation of the body passage sections, seat rings in said body surrounding passage section openings at opposite sides of the plug and having spherical surface means adapted for engaging corresponding spherical surface means on said plug during rotation of the plug between said positions, means mounting said seat rings for displacement toward and from the plug, resilient means biasing said seat rings toward said plug, upper and lower trunnion means within said body mounting said plug for rotation about an axis that is substantially normal to the seat ring axis, said lower trunnion means being fixed on the body and having a cylindrical inner end section projecting within a cylindrical recess in said plug, said upper trunnion means comprising a hollow tubular member fixed on the body and having a cylindrical inner end section projecting into said space into rotative bearing fit with a cylindrical recess in said plug, a valve actuating stem rotatably mounted in said hollow trunnion and having an outer end adapted to be connected to an actuator device, means on the inner end of said stem and within said plug recess providing an axially separable torque transmitting coupling between the stem and plug, thrust bearing means interposed between the lower end of said stem and the lower end of said hollow trunnion comprising a flat sided bearing annulus disposed between opposed flat radial surfaces on the stem and hollow trunnion, and coaxial bushings in said plug recesses providing radial bearings between the plug and said trunnions.

11. In the plug valve defined in claim 10, said hollow trunnion having an enlarged upwardly open bore in its upper end, and a cylindrical seal element in said bore having external peripheral sealing engagement with said trunnion and rotary sealing engagement with said stem, said seal element being axially retained in said bore by a readily removable fastener whereby said seal element may be replaced or repaired without separating the stem from its operative mounting in the trunnion.

* * * * *

UNITED STATES PATENT OFFICE
CERTIFICATE OF CORRECTION

PATENT NO. : 3,883,112
DATED : May 13, 1975
INVENTOR(S) : Bertram J. Milleville, Herman H. Fowler, John H. Fowler It is certified that error appears in the above–identified patent and that said Letters Patent are hereby corrected as shown below:

Column 8, Line 39, following "said" insert the following:

-- annulus, said one seat ring being mounted in the body for displacement toward and from the plug, resilient means biasing said one seat ring toward said plug, and an initial seal ring --

Signed and Sealed this

Thirteenth Day of July 1976

[SEAL]

Attest:

RUTH C. MASON
Attesting Officer

C. MARSHALL DANN
Commissioner of Patents and Trademarks